United States Patent [19]
Reese

[11] Patent Number: 4,753,669
[45] Date of Patent: Jun. 28, 1988

[54] WIRE MESH PRESS FACE COVER
[75] Inventor: Thomas J. Reese, Sarver, Pa.
[73] Assignee: PPG Industries, Inc., Pittsburgh, Pa.
[21] Appl. No.: 927,566
[22] Filed: Nov. 6, 1986
[51] Int. Cl.⁴ ............................................. C03B 23/02
[52] U.S. Cl. ...................................... 65/273; 65/104; 65/106; 65/374.11
[58] Field of Search ................ 65/102, 104, 106, 273, 65/275, 374.11

[56] References Cited
U.S. PATENT DOCUMENTS

| | | | |
|---|---|---|---|
| 3,148,968 | 9/1964 | Cypher et al. | 65/106 |
| 3,328,151 | 6/1967 | Richardson | 65/287 |
| 3,420,652 | 1/1969 | Seymour | 65/287 |
| 3,586,492 | 6/1971 | McMaster | 65/287 |
| 3,741,743 | 6/1973 | Seymour | 65/287 |
| 4,197,108 | 4/1980 | Frank et al. | 65/291 |
| 4,260,409 | 4/1981 | Reese et al. | 65/273 |
| 4,361,433 | 11/1982 | Smith, Jr. et al. | 65/106 X |
| 4,508,556 | 4/1985 | Bennett et al. | 65/25.4 |
| 4,539,031 | 9/1985 | Fecik et al. | 65/273 |

OTHER PUBLICATIONS

Metex Industrial Products Division, Knitted Wire Mesh Products.
ACS Industries, Inc., Knitted Wire Mesh for Industry.

Primary Examiner—Arthur Kellogg
Attorney, Agent, or Firm—Andrew C. Siminerio

[57] ABSTRACT

A mold cover for a glass sheet shaping mold having an insulating layer interposed between the shaping surface of the mold and an outer layer of knitted wire mesh. The knitted mesh is sufficiently flexible to conform to compound and/or complex shaping surface without wrinkling so as to maintain a smooth shaping surface.

16 Claims, 2 Drawing Sheets

WIRE MESH PRESS FACE COVER

BACKGROUND OF THE INVENTION

1. Field of the Invention

This invention relates to press bending, and in particular to an improved cover for a mold press face, especially for molds forming complex and complicated shapes in hot glass sheets.

2A Technical Considerations

Press bending is a well known shaping technique used in forming glazing units that require precisely defined curvatures dictated by the shape and outline of the glazing frame, for example, automotive windows. Press bending of glass sheets as disclosed in U.S. Pat. No. 4,197,108 to Frank et. al. and U.S. Pat. No. 4,508,556 to Bennett et al, is usually performed by heating the glass sheet to its heat softening temperature, conveying the heat softened glass to a position in a shaping station between upper and lower glass shaping members having complementing shaping surfaces, sandwiching the glass sheet between the shaping members to impart the desired shape, removing the shaped glass sheet from the shaping station and rapidly cooling the shaped glass to impart at least a partial temper. In the case of press bending heat softened glass sheets in a lehr as disclosed in U.S. Pat. No. 4,260,409 to Reese et al, the glass sheets are placed on a support carriage that is conveyed through a heating lehr to effect a preliminary shape to the glass sheet by gravity. After the preliminary shaping, a lower full surface pressing mold lifts the glass sheets off the carriage and into engagement with an upper full surface pressing mold to sandwich the glass sheets therebetween. The shaped glass sheets are then returned to the carriage and conveyed through an annealing zone of the furnace.

The shaping members may be provided with a covering to protect the glass sheet from the shaping member pressing surface. In particular, the surface of the hot glass sheet may get a "burn" mark if it contacts a bare metal pressing surface. A stretchable knit fiber glass cloth is commonly used to cover the pressing surface of the shaping member.

As automotive stylists continue to strive for more aerodynamic designs with less drag and wind resistance, there is a demand for more complex and compound shapes in automotive windows and windshields, such as deep wraps and reverse curvatures. Fiber glass cloth may be used to cover glass sheet shaping members, but the complexity of these shapes may cause excessive rubbing of the glass sheets against the cover during the shaping operation, such that the cover wears out at a accelerated rate, especially on concave shaping surfaces of the shaping member. Woven wire screen has been used to help increase the useful life of the fiber glass covers at high wear areas in surface areas of relatively simple curvature, but this screen may tend to wrinkle when stretched across or pressed against compound and/or complex shaping surfaces. The wrinkles cause irregularities in the pressing surface that may be transferred to the pressed glass sheets, causing optical distortion.

It would be advantageous to cover the shaping surface with a cover that can protect the hot glass sheets from the surface of the shaping member and conform to the complex and compound shaping surfaces without wrinkling.

2B. Patents of Interest

U.S. Pat. No. 3,148,968 to Cypher et al. discloses the use of knitted fiber glass fabric as a mold cover for pressing molds in a bending operation. As the mold contacts and presses the heat softened glass sheet, the knitted fiber glass fabric deforms to provides a resilient mold cover that also acts as an insulating layer between the hot glass sheet and the mold face.

U.S. Pat. No. 3,328,151 to Richerson discloses a wooden press bending mold with a composite pressing surface. The pressing surface of the mold includes alternating layers of woven glass cloth and aluminum foil with an outer glass sheet contacting surface of knitted fiberous glass material.

U.S. Pat. No. 3,420,652 to Seymour discloses a mold cover for bending glass sheets. The useful life of a fiber glass cover for a press face is increased by superimposing a fine wire screen on the fiber glass cloth at critical portions of the press face, such as areas of simple curvature or portions of the mold that contact a painted portion of the glass sheet. The screen is pulled against the fiber glass cloth and mold surface by a spring arrangement.

U.S. Pat. Nos. 3,586,492 to McMaster and 3,741,743 to Seymour disclose the use of wire mesh on a glass sheet support frame. In each patent, the glass sheet engaging surface of a ring like support frame is covered with at least one layer of wire mesh so that the heated glass sheet contacts the mesh rather than the underlying steel support structure. Seymour discloses the use of a fine wire mesh to contact the glass supported by an underlying heavier wire mesh.

U.S. Pat. No. 4,539,031 to Fecik et al, discloses an apparatus for press shaping hot glass sheets. The pressing member includes a ring-like frame covered with insulating material that will not mark the glass. The insulating material includes a wire screen embedded between an upper and lower layer of nitryl rubber. As the upper layer wears, it exposes the screen which will contact the glass sheet and impart a mark that is visible on the glass sheet upon inspection, but will not cause rejection of the shaped glass sheet.

SUMMARY OF THE INVENTION

An object of the present invention is to provide a temperature resistant, wear resistant cover for a mold press face. The cover includes a knitted wire mesh superimposed over an insulating material layer. The knitted mesh may conform to the curved surface of the mold during a pressing operation and maintains a smooth unwrinkled sheet shaping surface. The knitted mesh may be stainless steel wire and the insulating material may be refractory fiber paper. In one embodiment of the invention the cover may include only the knitted wire mesh.

Another object of the invention is to provide a mold for pressing heat softened material including an insulating material superimposed over the pressing surface of the mold and a knitted wire mesh with interconnecting wire loops superimposed over the insulating material. The knitted mesh is secured to strap members positioned around the periphery of the mold.

The knitted wire mesh provides a resilient, wear resistant covering that may deform to complex and/or compound curvatures of a bending mold without wrinkling. Woven wire mesh which is formed of straight wires in a rectangular weave cannot flex and deform to the extend that knitted mesh can without forming a surface irregularity, i.e. wrinkle, which may be pressed into a heat softened glass sheet. The knitted wire mesh provides a smooth pressing surface.

DETAILED DESCRIPTION OF THE INVENTION

The present invention is presented with respect to its use on the pressing surfaces of glass shaping members in a lehr press bending arrangement as disclosed in U.S. Pat. No. 4,260,409 to Reese et al, which is incorporated by reference herein, but it should be understood that the invention may be used in any application where a protective covering is required to maintain a wrinkle-free surface.

Figure 1:
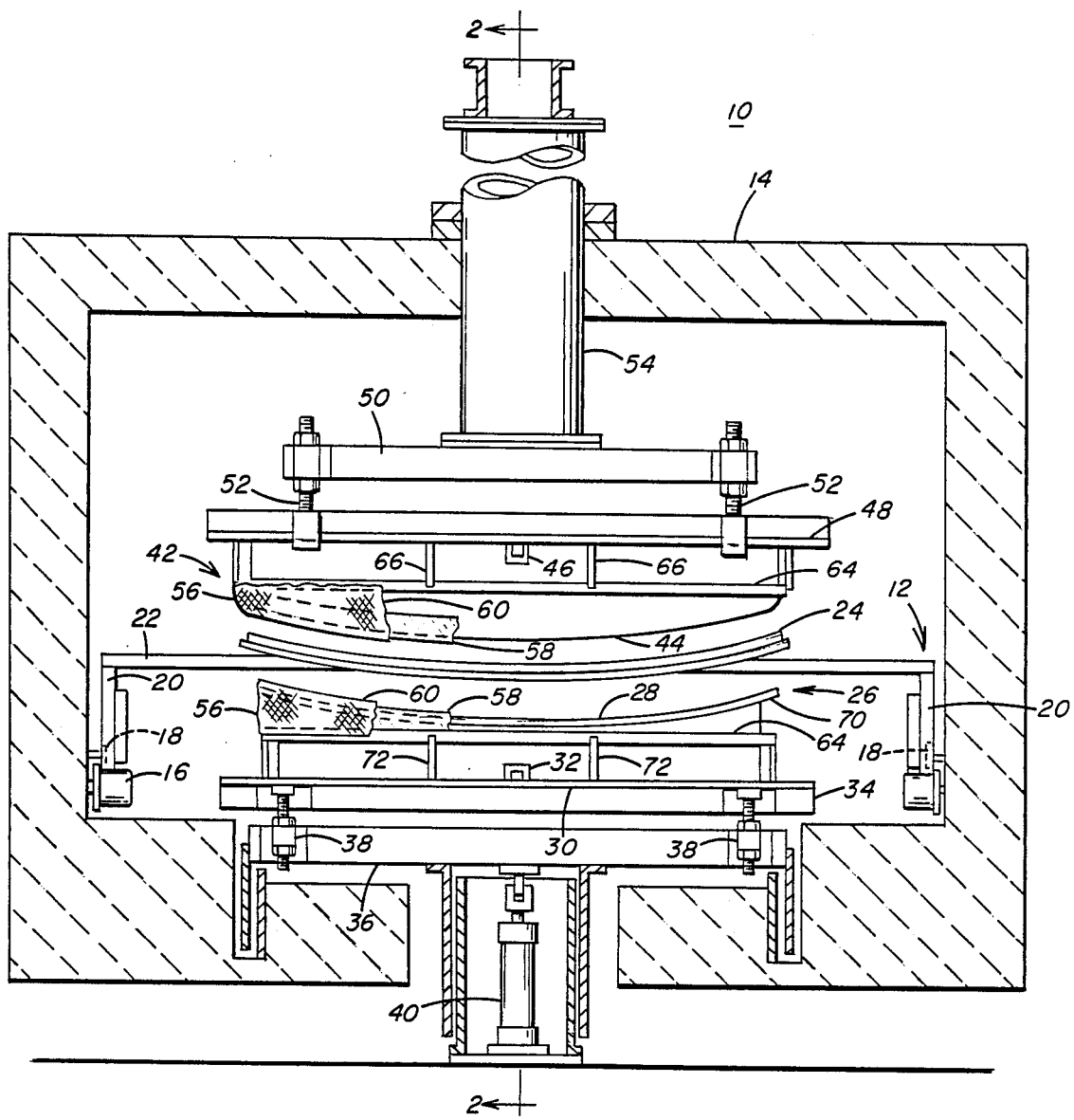
FIG. 1 is a cross-sectional view of a lehr press bending station, incorporating the press cover of the present invention.

In a lehr bending operation as disclosed in U.S. Pat. No. 4,260,409, glass sheets are loaded onto a plurality of mold support carriages, conveyed through the heating lehr where the glass sheets are bend by gravity to a preliminary shape, conveyed into a shaping station immediately beyond the gravity bending zone where the glass sheets are pressed between upper and lower molds to impart the final curvature and conveyed through an annealing zone where the shaped sheets are cooled. Referring to FIG. 1 which shows a cross-section of a press station 10, a plurality of mold support carriages 12 (one only shown in FIG. 1) extend transversely through lehr 14 and are conveyed through the lehr 14 by rotational engagement of stub rolls 16 with carriage rails 18. Each stub roll 16 is mounted on a shaft that extends through a side wall of the lehr 14 and is connected to a conveyor drive means (not shown). Upright members 20 connect the rails 18 to a pair of upper horizontal longitudinal rails 22, to which is mounted a glass sheet support rail 24. The glass sheet support rail 24 defines the curvature of the glass sheet at a location slightly inboard of its perimeter.

Figure 2:
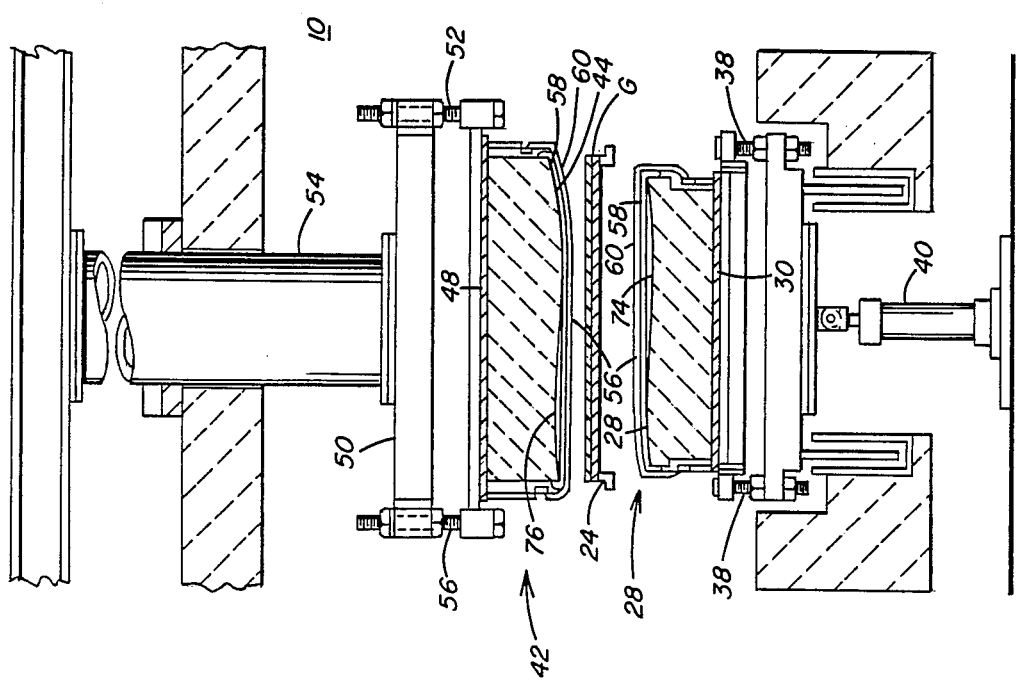
FIG. 2 is a sectional view taken along line 2—2 of FIG. 1 showing the upper and lower pressing molds in their separated position and covered with the mold press cover of the present invention.

With continued reference to FIG. 1, the bending station 10 comprises a lower pressing mold 26 that includes an upper press face 28 whose upper surface covers a continuous area whose outline is slightly smaller than the outline of the support rail 24 for reasons to be discussed later. The press face 28 defines the final curved shape of the glass sheet. In the particular embodiment of the lower pressing mold 26 as shown in FIGS. 1 and 2, the press face 28 defines a shape that is concave in elevation across the width of the lehr to conform to a longitudinal component of bend (see FIG. 1), and is S-shaped in elevation in the carriage conveying direction of the lehr 14 to conform to a desired transverse component of bend. The pressing mold 26 rests on a metal plate 30, and is held in alignment by pin and slot arrangement 32 similar to that disclosed in U.S. Pat. No. 4,260,409 which locates and maintains the geometric center of the press face 28 as the pressing mold 26 expands and contracts during heating and cooling. The metal plate 30 is secured to reforcing frame 34, which is connected to a lower frame 36 by vertical adjustment means 38, for example; by adjusting screws. A lower piston 40 is connected to the lower frame 36 to raise and lower the lower pressing mold 26 in a vertical direction to positions controlled by the stroke of the lower piston 40 and the adjustment of the vertical adjustment means 38. When the lower piston 40 moves the lower pressing mold 26, the geometric center of the press face 28, moves along a fixed vertical axis at the geometric center of the press bending station 10.

With continued reference to FIG. 1, the press bending station 10 also includes an upper pressing mold 42 comprising a lower press face 44 that defines a downwardly facing shaping surface that complements the upwardly facing shaping surface defined by the press face 28 of the lower pressing mold 26. The upper pressing mold 42 is supported in a position such that the geometric center of its press face 44 is intersected by the vertical axis of movement for the geometric center of the press face 28 of the lower pressing mold 26, and so that the downwardly facing shaping surface defined by the press face 44 is oriented and aligned over the upwardly facing shaping surface defined by press face 28. A pin and slot arrangement 46 similar to that on lower press mold 26 is used to maintain the geometric center of the press face 44. The mold 42 is bolted to a metal plate 48 and is adjustably secured to an upper metal frame 50 through vertical adjusting means 52 which may be similar in construction to the vertical adjustment means 38. A vertical column 54 supported from an overhead support structure and adjustable by screw jacks (not shown) is used to hold the upper pressing mold 42 in a desired position.

Figure 3:
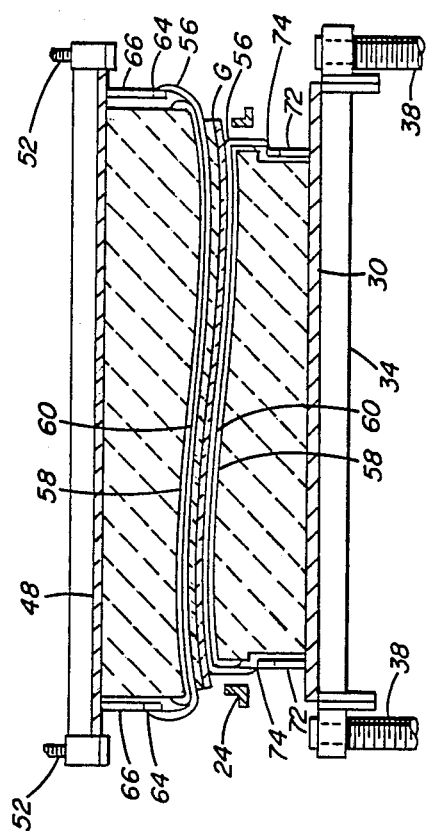
FIG. 3 is a view similar to that of FIG. 2, showing the glass sheets lifted by the lower pressing mold into engagement with the upper pressing mold and the mold covers conforming to the pressing surfaces of the upper and lower molds.

The press faces 28 and 44 of the molds 26 and 42 respectively, may be either ceramic as shown in FIGS. 1 through 3, metal, or any other type of high temperature, wear resistant material. Each press face includes a press cover 56 which is the object of this invention. The press cover 56 includes an insulating material layer 58, which acts as an insulator between the hot glass sheet G and the press face to reduce the amount of heat loss in the glass sheets during pressing. In addition, the layer 58 should be sufficiently bulky so as to act as a cushion to absorb any small defects in the press face surfaces or capture any particles such as dust or glass chips on the press face and prevent these irregularities from being transferred to the glass surface during pressing and causing optical distortion. Due to the complexity of the compound and/or complex curvature of the press faces 28 and 44, insulating material layer 58 preferably has good tensile strength flexibility so that it may conform to the press face surfaces. In one particular embodiment of the invention, the insulating material layer 58 may be a refractory fiber paper, such as material sold under the tradenames of Cerafiber, Cerawool, or Pyrotek paper available from Johns-Mansville, Colo. Other materials, such as a fiber glass cloth may be used for the layer 58.

Figure 4:
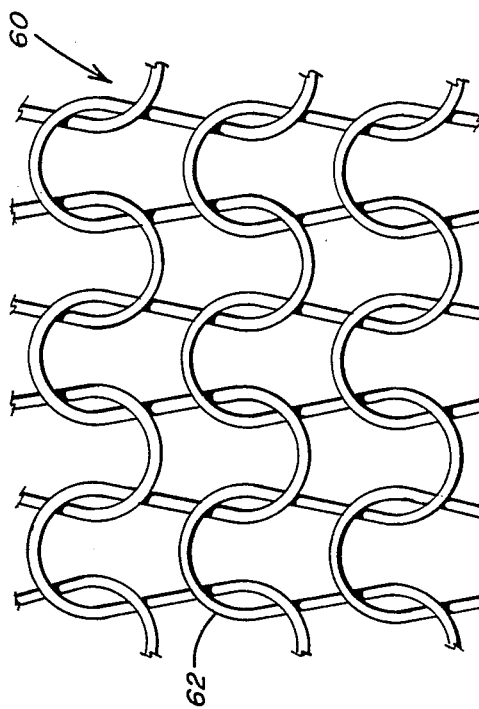
FIG. 4 is an enlarged plan view showing a section of the knitted wire mesh, illustrating its interlocking loop configuration.

The press cover 56 further includes a knitted wire mesh 60 to cover the insulating material 58. The knitted feature of the mesh material 60 allows it to be formed over the press faces. The knitted mesh conforms to the compound and/or complex surfaces of the press faces 28 and 44, and does not wrinkle as does woven wire screen, which includes straight wires forming a rectangular weave, when forced to conform to other than simple curvatures. The knitted mesh 60 is formed by interlocking loops 62 as shown in FIG. 4, that can move relative to one another and still retain relatively smooth and unwrinkled curved surfaces. The knitted mesh 60 holds the insulating material 58, and provides a more durable contact surface between the glass G and insulating material 58.

In choosing the proper size mesh, several factors are of importance. The mesh must be flexible to conform to the press face surface without wrinkling, and resilient to withstand repeated loading from successive pressing operations. In addition, the weave of the interlocking loops 62 should be preferably "tight" enough i.e. have closely spaced wires, so as to avoid any marking on the glass. An increased number of wires in a given area will reduce the pressure on each individual wire and thus lessen any marking due to the knitted mesh. In a preferred embodiment, the knitted mesh 60 is made of 0.0045 inch (0.114 millimeters) diameter wire with a mesh opening of 14 to 16 per inch. The wire is preferably made of 304 stainless steel wire, so that it may operate for an extended useful life at the high temperatures to which it is subjected during the hot glass sheet pressing operation. The knitted wire mesh is available from Metex, New Jersey or ACS Industries, Inc., Rhode Island.

Referring to FIGS. 1 through 3, the insulating layer 58 is initially stretched across press faces 28 and 44 of molds 26 and 42, respectively, and taped around the perimeter of the mold to hold it in place. Knit wire mesh 60 is next stretched over the insulating layer 58 and secured to strap members 64, which extend around the perimeter of each press by tack welding, clamps or any other well known attaching arrangements.

In the pressing arrangement as shown in FIG. 1, when the carriage 12 which supports the heat softened, the preformed glass sheets are positioned within the pressing station 10, lower mold 26 moves vertically upward through the outline of the rail 24 on carriage 12 to lift the glass sheets off the carriage 12 and press it against the upper mold 42. It is preferred that the lower mold 26 contact as much of the glass G surface as possible so that proper contour of the glass sheets may be effected as close to the edge of the glass sheet as possible. As a result in the particular embodiment as shown in FIG. 1, the strap 64 of the upper press 42 may be positioned outside the perimeter of the press face 44, and supported by hangers 66 from back plate 48. On the other hand, on lower press 26 the straps 68 are positioned within a circumferential ledge 70 beneath the press surface 28 of the mold 26 and is supported by posts 72, so that the lower press 26 may extend as close as possible to the rail 24 of the carriage 12 without any interference from the straps 64 or posts 72.

Once the covering 56 is in position and the molds 26 and 42 are subjected to a heated environment, for example a temperature range of approximately 1000° F. to 1200° F. (538° C. to 649° C.) for a typical heating lehr, the binder in the insulating material 58 may burn off, leaving the refractory fiber of the insulating paper to coat the press faces. If desired, the insulating material 58 may be glued to the press faces 28 and 44 by high temperature adhesives.

It should be noted that in areas of reverse curvatures or concave curvatures, such as areas 74 and 76 in lower and upper molds 26 and 42, respectively, the mesh 60 may not lay flat against the press faces, but rather be slightly spaced from the press face when the molds are spaced from one another as shown in FIG. 2. This is due to the inherent resiliency of the knitted wire mesh 60. The loops 62 (as shown in FIG. 4) may act as springs when subjected to a force. During the pressing operation, when a glass sheet G is pressed between molds 26 and 42 as shown in FIG. 3, the knitted mesh 60 will flex and stretch to conform to the curvature of the press faces 28 and 44. After pressing, when the molds are separated and load is removed, the knitted mesh 60 may "spring back" and resume its original form as shown in FIG. 2. Because the knitted mesh 60 may be spaced from certain portions of the press faces, it follows that in the upper press 42, the insulating material 58, and especially the remaining refractory fibers of the insulating paper, may also fall away from the press face 44 when the presses are separated as shown in FIGS. 1 and 2. However, the knitted mesh 60 will continue to support the material layer 58 relative to the press 42 so that during pressing, the material layer 58 will be displaced back against the press face 44 to insulate and protect the hot glass sheet G.

As stated earlier, insulating material layer 58 acts as both an insulator between the hot glass sheet and the press face, and as a cushion to absorb any irregularities in the press surface and to capture any small particles that may be on the press face. When the presses are of ceramic construction, the insulating property is not necessary, but any alternative to the refractory paper on a ceramic press still must function as a cushion and be resistant to high temperatures. It is believed that the knitted mesh 60 may be of sufficient thickness to absorb any small irregularities in the press face and capture any small particles that may form irregularities in the pressed glass surface so that the mesh 60 may be used without the insulating material 58 on a ceramic press face.

The forms of the invention shown and described herein, represent an illustrative embodiment, and it is understood that various changes may be made without the departing from the scope of the invention.

I claim:

1. A mold cover for a heat softened sheet material shaping mold having a complicated sheet shaping surface comprising:
    a heat insulating material layer to thermally insulates said heat softened sheet material from said shaping nold;
    a wear resistant, knitted wire mesh stretched across said insulating layer and said shaping surface to provide a durable contact surface between said heat softened sheet and said insulating layer wherein said cover substantially conforms to the complicated shapaing surface of said shaping mold while providing a smooth unwrinkled sheet shaping surface; and
    means to secure said mesh to said mold wherein said mesh has additional resiliency to stretch further and maintain said smooth, unwrinkled sheet shaping surface while secured to said mold and engaging a heat softened sheet material.

2. The mold cover as in claim 1 wherein said insulating layer is of sufficient bulk to cushion any irregularities in the sheet shaping surface of said cover.

3. The mold cover as in claim 2 wherein said insulating layer is a refractory fiber paper.

4. The mold cover as in claim 3 wherein said knitted wire mesh is made of stainless steel wire.

5. The mold cover as in claim 4 wherein said heat softened sheet material is a glass sheet.

6. An apparatus for shaping heat softened sheets comprising:
- a pair of opposing press faces each with a complementing complicated sheet engaging surface conforming to the final shape of said sheet to be shaped;
- an insulating material layer convering at least one of said sheet engaging surfaces of said opposing press faces to thermally insulate said heat softened sheet material from said sheet engaging surface;
- a wear resistant, knitted wire mesh stretched across said insulating layer and said sheet engaging surface to provide a durable contact surface between said heat softened sheet and said insulating layer wherein said insulating layer and said knitted mesh substantially conform to said complicataed sheet engaging surface of said at least one press face while providing a smooth unwrinkled sheet engaging surface; and
- means to secure said mesh to said at least one press face wherein said mesh has additional resiliency to stretch further and maintain said smooth unwrinkled sheet engaging surface while secured to said press face and engaging said heat softened sheet.

7. The mold as in claim 6, wherein said securing means includes strap members positioned around the periphery of said mold and means to attach said knitted wire mesh to said strap members.

8. The mold as in claim 7, wherein said attaching means includes tack welding said mesh to said strap members.

9. The mold as in claim 7, wherein said insulating layer includes refractory fiber paper.

10. The mold as in claim 9, wherein said interconnected loops of said knitted wire mesh are made of stainless steel wire.

11. The mold as in claim 10, wherein said knitted wire mesh covers said sheet engaging surface of said press face in its entirety.

12. The mold as in claim 11, wherein said heat softened sheets are glass sheets.

13. An apparatus for shaping heat softened sheets comprising;
- a pair of opposing ceramic press faces each with a complementing complicated sheet engaging surface conforming to the final shape of said sheet to be shaped;
- a wear resistant, knitted wire mesh stretched across said sheet engaging surface of at least one of said press faces to provide a durable contact surface between said heat softened sheet and said ceramic press face wherein said knitted wire mesh substantially conforms to the shape of said complicated sheet engaging surface of said at least one ceramic press face while providing a smooth unwrinkled sheet shaping surface; and
- means to secure said mesh to said press face wherein said mesh has additional resiliency to stretch further and maintain said smooth unwrinkled sheet shaping surface while secured to said press face and engaging a heat softened sheet.

14. The mold as in claim 13, wherein said securing means includes strap members positioned around the periphery of said mold and means to attach said mesh to said strap members.

15. The mold as in claim 14, wherein said attaching means includes tack welding said mesh to said strap members.

16. The mold as in claim 15, wherein said knitted wire mesh is made of stainless steel wire.

* * * * *